US008639405B2

(12) United States Patent
Yamada et al.

(10) Patent No.: US 8,639,405 B2
(45) Date of Patent: Jan. 28, 2014

(54) ELECTRIC MOTOR DRIVE SYSTEM FOR AN ELECTRIC VEHICLE

(75) Inventors: Kenji Yamada, Toyota (JP); Akiyoshi Morii, Kariya (JP); Hirofumi Kako, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 66 days.

(21) Appl. No.: 13/394,732

(22) PCT Filed: Jul. 23, 2010

(86) PCT No.: PCT/IB2010/001811
§ 371 (c)(1),
(2), (4) Date: Mar. 7, 2012

(87) PCT Pub. No.: WO2011/030192
PCT Pub. Date: Mar. 17, 2011

(65) Prior Publication Data
US 2012/0173066 A1     Jul. 5, 2012

(30) Foreign Application Priority Data
Sep. 8, 2009   (JP) .............................. 2009-206805

(51) Int. Cl.
*B60L 11/10* (2006.01)
(52) U.S. Cl.
USPC ................. 701/22; 180/65.285; 180/65.31; 903/906; 903/930
(58) Field of Classification Search
USPC ............. 701/22; 180/65.21, 65.265, 65.275, 180/65.285, 65.31; 903/903, 906, 930
See application file for complete search history.

(56) References Cited

U.S. PATENT DOCUMENTS

| 6,320,274 B1 | 11/2001 | Goetze et al. | |
| 7,237,634 B2 * | 7/2007 | Severinsky et al. | 180/65.23 |
| 7,298,102 B2 * | 11/2007 | Sopko et al. | 318/139 |

(Continued)

FOREIGN PATENT DOCUMENTS

| DE | 19752661 A1 | 6/1999 |
| EP | 1881596 A2 | 1/2008 |

(Continued)

OTHER PUBLICATIONS

Singh, G.K. A Research Survey of Induction Motor Operation with Non-Sinusoidal Supply Wave Forms, Electric Power Systems Research, vol. 75, Iss. 2-3, Aug. 2005, pp. 200-213.*

*Primary Examiner* — Russell Frejd
(74) *Attorney, Agent, or Firm* — Gifford, Krass, Sprinkle, Anderson & Citkowski, P.C.

(57) ABSTRACT

In an electric motor drive system for an electric vehicle that includes a converter for performing direct-current voltage conversion and an inverter that converts the output voltage of the converter into alternating-current voltage, a control apparatus makes a required torque response determination to determine whether the electric vehicle is in a state in which high torque response is needed. Furthermore, in a drivability priority mode in which high torque response is needed, the control apparatus sets a voltage command value for the converter in a range where sine wave PWM control can be applied. On the other hand, in a fuel efficiency priority mode in which high torque response is not needed, the control apparatus sets the voltage command value for the converter such that power loss in the overall electric motor drive system is minimized, based on the operating state of an alternating-current electric motor.

12 Claims, 7 Drawing Sheets (56) References Cited

U.S. PATENT DOCUMENTS

| | | |
|---|---|---|
| 7,304,451 B2 | 12/2007 | Morimoto et al. |
| 7,701,156 B2 | 4/2010 | Okamura |
| 2006/0119297 A1 | 6/2006 | Okamura et al. |
| 2007/0278986 A1 | 12/2007 | Okamura |
| 2008/0297099 A1 | 12/2008 | Maekawa |
| 2009/0108794 A1 | 4/2009 | Ochiai et al. |
| 2009/0121669 A1 | 5/2009 | Hanada |
| 2010/0156172 A1 | 6/2010 | Pugsley et al. |
| 2010/0194330 A1 | 8/2010 | Hayashi |

FOREIGN PATENT DOCUMENTS

| | | |
|---|---|---|
| FR | 2915722 A1 | 11/2008 |
| JP | 2006311768 A | 11/2006 |
| JP | 2007325351 A | 12/2007 |
| JP | 2009095144 A | 4/2009 |
| WO | WO-2005088822 A1 | 9/2005 |

* cited by examiner

| CONTROL | PWM CONTROL MODE | | RECTANGULAR WAVE VOLTAGE CONTROL MODE |
|---|---|---|---|
| | SINE WAVE PWM | OVERMODULATION PWM | RECTANGULAR WAVE (ONE PULSE) |
| INVERTER OUTPUT VOLTAGE WAVEFORM | FUNDAMENTAL WAVE COMPONENT | FUNDAMENTAL WAVE COMPONENT | FUNDAMENTAL WAVE COMPONENT |
| MODULATION FACTOR | 0 TO APPROXIMATELY 0.61 | APPROXIMATELY 0.61 TO 0.78 | 0.78 |
| CHARACTERISTIC | LITTLE TORQUE FLUCTUATION | IMPROVEMENT IN OUTPUT IN MEDIUM SPEED REGION | IMPROVEMENT IN OUTPUT IN HIGH SPEED REGION |

ELECTRIC MOTOR DRIVE SYSTEM FOR AN ELECTRIC VEHICLE

CROSS-REFERENCE TO RELATED APPLICATIONS

This application is the U.S. National Phase of PCT/IB2010/001811 filed Jul. 23, 2010, which claims priority of Japanese Patent Application 2009-206805 filed Sep. 8, 2009.

BACKGROUND OF THE INVENTION

1. Field of the Invention

The invention relates to an electric motor drive system for an electric vehicle, and more particularly, a system that drives and controls an alternating-current electric motor by converting direct-current voltage that has been variably controlled by a converter into alternating-current voltage by an inverter.

2. Description of the Related Art

A system that drives and controls a three-phase alternating-current electric motor by converting direct-current voltage (DC voltage) into alternating-current voltage (AC voltage) with an inverter is in general use. With this kind of electric motor drive system, the motor current is typically controlled according to pulse width modulation (PWM) control based on vector control in order to drive the electric motor efficiently. Japanese Patent Application Publication No. 2006-311768 (JP-A-2006-311768) and Japanese Patent Application Publication No. 2007-325351 (JP-A-2007-325351), for example, describe structures in which the output voltage of a power storage device (represented by a secondary battery) is variably controlled and converted to direct-current side voltage for an inverter, by providing a converter that performs direct-current voltage conversion.

With this kind of an electric motor drive system, determining how to set the controllable output voltage of the converter, i.e., the input side voltage of the inverter, becomes an issue. For example, JP-A-2006-311768 describes a system that sets a voltage command value so that the modulation factor in PWM control matches a modulation factor target value set taking system loss into account. Also, JP-A-2007-325351 describes a system that sets a voltage command value so as to minimize power loss in the overall system that includes a battery, a converter, an inverter, and a motor-generator, according to the state of the motor at that time.

Also, similarly, in an electric motor drive system provided with a converter, JP-A-2006-311768, JP-A-2007-325351, and Japanese Patent Application Publication No. 2009-95144 (JP-A-2009-95144) describe using control modes other than sine wave PWM control. These publications describe using sine wave PWM control for reducing torque fluctuation in a low speed region, while applying an overmodulation PWM control mode in a medium speed region, and rectangular wave voltage control in a high speed region. Also, International Publication (Republication) No. WO2005/088822, for example, describes expanding the modulation factor range where sine wave PWM control can be applied by superimposing a harmonic wave.

However, if a control structure is used that changes the converter output voltage frequently in order to match the actual modulation factor with the modulation factor target value, as described in JP-A-2006-311768, drivability of the electric vehicle that is run by the output of the electric motor may decrease due to reduced controllability of the output torque of the electric motor. Alternatively, power loss may end up increasing due to the voltage conversion operation of the converter changing frequently.

On the other hand, setting the system voltage focusing only on the overall loss, as described in JP-A-2007-325351, is advantageous in that rectangular wave voltage control in which there are relatively few switches in the inverter is applied. However, with rectangular wave voltage control, the torque controllability of the electric motor is lower than it is with sine wave PWM control, so if priority is given only to reducing system loss, i.e., improving fuel efficiency, drivability of the electric vehicle may decrease due to reduced torque response.

SUMMARY OF THE INVENTION

The invention thus provides a control over output voltage of a converter that is able to improve fuel efficiency by suppressing power loss in an electric motor drive system of an electric vehicle provided with a converter for performing direct-current voltage conversion and an inverter that converts the output voltage of the converter into alternating-current voltage, while ensuring drivability of the electric vehicle by ensuring torque controllability, according to the state of the vehicle.

A first aspect of the invention relates to an electric motor drive system for an electric vehicle provided with an alternating-current electric motor for generating vehicle driving force. This electric motor drive system includes: a direct-current power supply; a converter structured so as to output a second direct-current voltage that is equal to or higher than a first direct-current voltage from the direct-current power supply to a direct-current power supply line by variably controlling the first direct-current. voltage according to a voltage command value; an inverter that is structured so as to perform power conversion between direct-current power in the direct-current power supply line and alternating-current power that drives the alternating-current electric motor, by a plurality of switching elements such that the alternating-current electric motor operates according to an operating command; control mode selecting means for controlling the inverter according to one of two modes, one mode being a first control mode that is applied when a modulation factor of the power conversion, which is expressed by the ratio of a fundamental wave component of the amplitude of a line voltage of the alternating-current electric motor to the second direct-current voltage, is equal to or less than a predetermined value, and the other mode being a second control mode for controlling the alternating-current electric motor with a modulation factor that is higher than that of the first control mode; and voltage command value setting means for setting the voltage command value for the converter. The voltage command value setting means includes i) required torque response determining means for determining the degree of torque response required of the alternating-current electric motor, according to the state of the electric vehicle, ii) first setting means for setting the voltage command value within a range of the second direct-current voltage where the first control mode is able to be applied, according to the operating state of the alternating-current electric motor when it is determined that the required torque response is higher than a predetermined level, and iii) second setting means for setting the voltage command value such that the second control mode is able to be applied, according to the operating state of the alternating-current electric motor when it is determined that the required torque response is not higher than the predetermined level.

In this aspect, power loss in the overall electric motor drive system at the second direct-current voltage corresponding to the voltage command value set by the second setting means may be less than the power loss at the second direct-current voltage corresponding to the voltage command value set by the first setting means.

In the aspect described above, the second setting means may set the voltage command value in response to the second direct-current voltage at which power loss, that is in the overall electric motor drive system at the second direct-current voltage corresponding to the voltage command value set by the second setting means, at an operating point of the alternating-current electric motor corresponding to the current operating state is minimized, according to a preset relationship among the operating point of the alternating-current electric motor, the second direct-current voltage, and the power loss.

Also, in the structure described above, the first setting means may include i) basic setting means for setting a first target voltage corresponding to a basic value of the second direct-current voltage for applying the first control mode, at an operating point that is determined by rotation speed and torque and corresponds to the current operating state of the alternating-current electric motor, and ii) correcting means for setting the voltage command value by correcting the first target voltage such that the modulation factor becomes the maximum value within a range within which the first control mode is able to be applied.

In the structure described above, the first setting means may further include iii) determining means for determining whether the electric vehicle is in a steady traveling state based on a torque control state of the alternating-current electric motor; and iv) voltage command value selecting means for setting the first target voltage that has been corrected by the correcting means as the voltage command value, when the electric vehicle is in the steady traveling state, and setting the first target voltage from the basic setting means as the voltage command value without that first target voltage being corrected, when it is determined that the electric vehicle is not in the steady traveling state.

Also, in the structure described above, the correcting means may include i) first calculating means for calculating the modulation factor based on an output voltage command value of the inverter and the second direct-current voltage, ii) second calculating means for calculating a correction voltage according to a difference between the calculated modulation factor and the maximum value, and iii) third calculating means for subtracting the correction voltage from the first target voltage set by the basic setting means.

In the structure described above, the first setting means may further include iv) step-up necessity determining means for determining whether a step-up operation by the converter is necessary based on the modulation factor calculated by the first calculating means, and v) step-up stopping mode, selecting means for selecting a step-up stopping mode without stepping up an output voltage of the direct-current power supply when the step-up necessity determining means determines that the step-up operation is not necessary.

In the structure described above, the step-up stopping mode selecting means may set the voltage command value to the first target voltage when the step-up necessity determining mean determines that the step-up operation is not necessary.

In the structure described above, the electric motor drive system may also include converter controlling means for duty controlling the converter according to the first direct-current voltage and the second direct-current voltage, and the voltage command value set by the voltage command value setting means. The first setting means may also further include iv) step-up necessity determining means for determining whether a step-up operation by the converter is necessary based on the modulation factor calculated by the first calculating means. The converter controlling means may operate the converter in the step-up stopping mode when the step-up necessity determining means has determined that the step-up operation is not necessary.

In the structure described above, the determining means may determine that the electric vehicle is in the steady traveling state when a difference between an actual torque and a torque command value for the alternating-current electric motor has continued to be less than a predetermined determining value for a predetermined period of time.

In the structure described above, in the first control mode, a torque of the alternating-current electric motor may be controlled by sine wave pulse width modulation control, and in the second control mode, the torque of the alternating-current electric motor may be controlled by overmodulation pulse width modulation control or rectangular wave voltage control.

A second aspect of the invention relates to an electric motor drive method for an electric vehicle provided with an alternating-current electric motor for generating vehicle driving force. The electric motor drive method includes: determining the degree of torque response required of the alternating-current electric motor, according to the state of the electric vehicle; setting the voltage command value within a range of the second direct-current voltage where the first control mode is able to be applied, according to the operating state of the alternating-current electric motor when it is determined that the required torque response is higher than a predetermined level; and setting the voltage command value such that the second control mode is able to be applied, according to the operating state of the alternating-current electric motor when it is determined that the required torque response is not higher than the predetermined level.

These aspects make it possible to improve fuel efficiency by suppressing power loss in an electric motor drive system of an electric vehicle provided with a converter for performing direct-current voltage conversion and an inverter that converts the output voltage of the converter into alternating-current voltage, while ensuring drivability of the electric vehicle by ensuring torque controllability, by setting the output voltage of the converter appropriately according to the state of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF AN EMBODIMENT

An example embodiment of the present invention will be described in greater detail below with reference to the accompanying drawings. Incidentally, like or corresponding parts will be denoted by like reference characters and descriptions of those parts will generally not be repeated.

Figure 1:
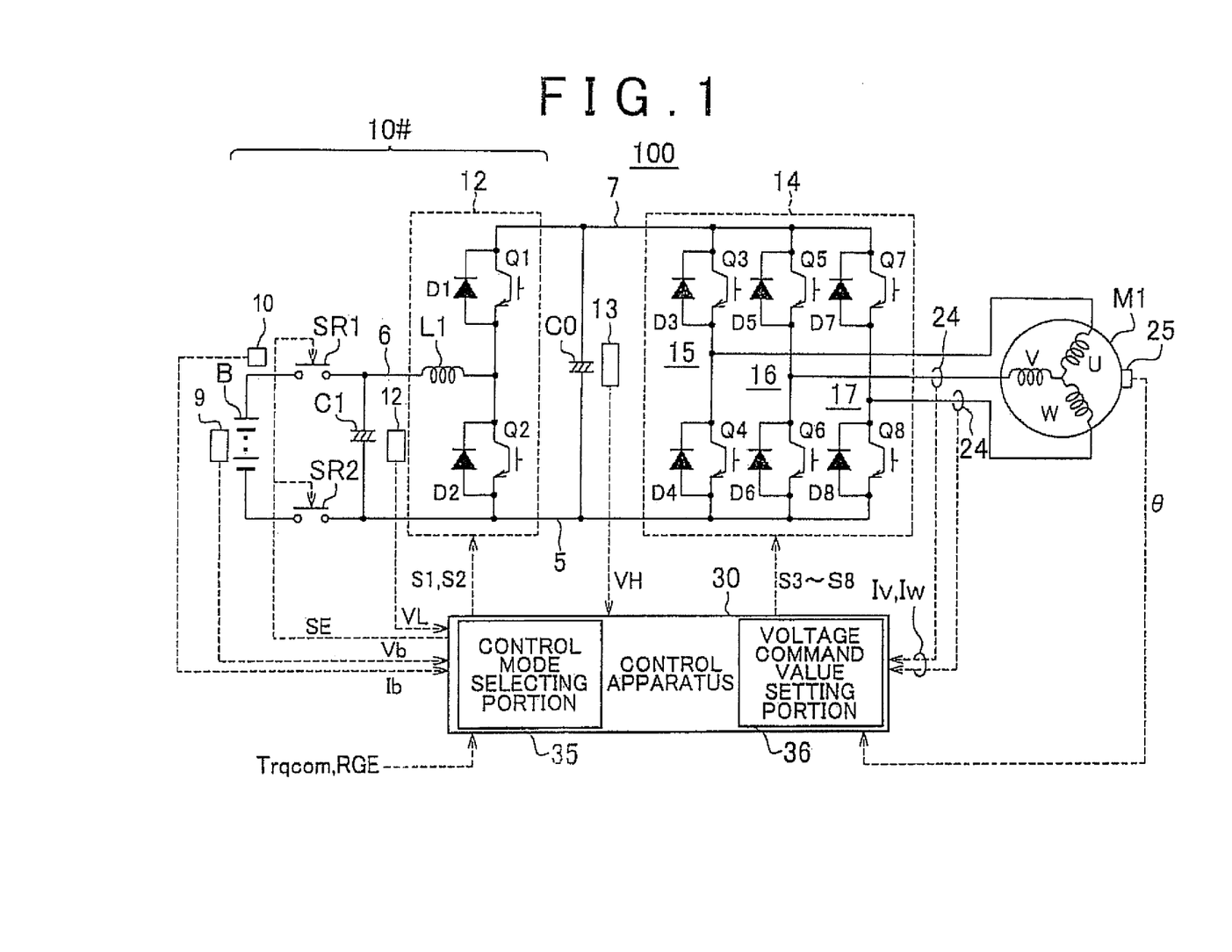
FIG. 1 is an overall block diagram of an electric motor drive system according to an example embodiment of the invention.

(Overall structure of the electric motor control) FIG. 1 is a diagram of the overall structure of an electric motor drive system according to an example embodiment of the invention.

As shown in FIG. 1, the electric motor drive system 100 includes a direct-current voltage generating portion (hereinafter simply referred to as "DC voltage generating portion") 10#, a smoothing capacitor C0, an inverter 14, an alternating-current electric motor (hereinafter simply referred to as "AC electric motor") M1, and a control apparatus 30.

The AC electric motor M1 is a driving motor for generating torque used to drive driving wheels of a vehicle powered partially or entirely by electricity (i.e., a vehicle that generates vehicle driving force using electric energy, such as a hybrid vehicle, an electric vehicle, or a fuel cell vehicle, and simply referred to as "electric vehicle" in this specification). Alternatively, the AC electric motor M1 may be configured to function as a generator that is driven by an engine, or as both an electric motor and a generator. Moreover, the AC electric motor M1 may operate as an electric motor for the engine. For example, the AC electric motor M1 may be incorporated in a hybrid vehicle as an electric motor capable of starting the engine.

The DC voltage generating portion 10# includes a DC power supply B, system relays SR1 and SR2, a smoothing capacitor C1, and a converter 12.

The DC power supply B is representatively formed by a power storage device such as an electric double layer capacitor or a secondary battery such as a nickel-metal-hydride battery or a lithium-ion battery. The input/output current (battery current) Ib of the DC power supply B is detected by a current sensor 9, and the output voltage Vb of the DC power supply B is detected by a voltage sensor 10.

The system relay SR1 is connected between the positive terminal of the DC power supply B and a power line 6. The system relay SR2 is connected between the negative terminal of the DC power supply B and a ground wire 5. These system relays SR1 and SR2 are turned on and off by a signal SE from the control apparatus 30. The condenser C1 is connected between the ground wire 5 and the power line 6. A voltage sensor 11 detects the voltage at both terminals of the smoothing capacitor C1, i.e., the input side voltage VL of the converter 12, and outputs the detected value to the control apparatus 30.

The converter 12 includes a reactor L1, power semiconductor switching elements Q1 and Q2, and diodes D1 and D2.

The power semiconductor switching elements Q1 and Q2 are connected in series between a power line 7 and the ground wire 5. The power semiconductor switching elements Q1 and Q2 are controlled on and off by switching control signals S1 and S2 from the control apparatus 30.

In this example embodiment of the invention, an IGBT (Insulated Gate Bipolar Transistor), a power MOS (Metal Oxide Semiconductor) transistor, or a power bipolar transistor or the like may be used for each power semiconductor switching element (hereinafter simply referred to as a "switching element"). The switching element Q1 is provided with an antiparallel diode D1, and the switching element Q2 is provided with an antiparallel diode D2. The reactor L1 is connected between the power line 6 and the connecting nodes of the switching elements Q1 and Q2. Also, the smoothing capacitor C0 is connected between the power line 7 and the ground wire 5.

The inverter 14 is formed of U-phase upper and lower arms 15, V-phase upper and lower arms 16, and W-phase upper and lower arms 17, which are parallel to each other between the power line 7 and the ground wire 5. Each of the phase upper and lower arms is formed of switching elements that are connected in series between the power line 7 and the ground wire 5. For example, the U-phase upper and lower arms 15 are formed of switching elements Q3 and Q4, the V-phase upper and lower arms 16 are formed of switching elements Q5 and Q6, and the W-phase upper and lower arms 17 are formed of switching elements Q7 and Q8. Also, these switching elements Q3 to Q8 are connected to antiparallel diodes D3 to D8, respectively. The switching elements Q3 to Q8 are controlled on and off by switching control signals S3 to S8 from the control apparatus 30.

Representatively, the AC electric motor M1 is a three-phase permanent magnet type synchronous motor in which one end of each of a U-phase coil, a V-phase coil, and a W-phase coil are commonly connected to a neutral point. Furthermore, the other end of each of the coils is connected to a point midway between the switching elements of the corresponding phase upper and lower arms 15 to 17.

During a step-up operation, the converter 12 supplies DC voltage VH in which the DC voltage Vb supplied from the DC power supply B has been stepped up (this DC voltage that corresponds to the voltage input to the inverter 14 may also hereinafter be referred to as the "system voltage") to the inverter 14. More specifically, the period during which the switching element Q1 is on and the period of time during which the switching element Q2 is on (hereinafter simply referred to as the "ON time") (or the periods of time during which both of the switching elements Q1 and Q2 are off; hereinafter simply referred to as the "OFF time") are alternated in response to the switching control signals S1 and S2 from the control apparatus 30, and the step-up ratio corresponds to the ratio of these ON times.

Alternatively, VH may also be set equal to Vb (in which case the step-up voltage=1.0) if the switching element Q1 is fixed ON and the switching element Q2 is fixed OFF. This kind of operation by the converter 12 may also be referred to as a "step-up stopping mode". In this step-up stopping mode, power loss does not occur when the switching elements are turned on and off, so the efficiency of the converter 12 is improved.

Also, during a step-down operation, the converter 12 steps down the DC voltage VH (i.e., the system voltage) supplied from the inverter 14 via the smoothing condenser C0 and charges the DC power supply B. More specifically, the ON time of only the switching element Q1 and the OFF time of both of the switching elements Q1 and Q2 (or the ON time of the switching element Q2) are alternated in response to the switching control signals S1 and S2 from the control apparatus 30, and the step-down ratio corresponds to the duty ratio of the ON time.

In this way, the converter 12 variably controls the DC voltage VL from the DC power supply B according to the voltage command value, and outputs DC voltage VH that is equivalent to or higher than the DC voltage VL to the power line 7 that is connected to the DC link side of the inverter 14. That is, the power line 7 may correspond to the "direct-current power supply line" of this application.

The smoothing capacitor C0 smoothes the DC voltage from the converter 12 and supplies this smoothed DC voltage to the inverter 14. A voltage sensor 13 detects the voltage at both terminals of the smoothing capacitor C0, i.e., the system voltage VH, and outputs the detected value to the control apparatus 30.

When the torque command value of the AC electric motor M1 is positive (i.e., Trqcom>0) and DC voltage is supplied from the smoothing capacitor C0, the inverter 14 converts the DC voltage into AC voltage by a switching operation of the switching elements Q3 to Q8 in response to the switching control signals S3 to S8 from the control apparatus 30 and drives the AC electric motor M1 to output positive torque. Also, when the torque command value of the AC electric motor M1 is zero (i.e., Trqcom =0), the inverter 14 converts the DC voltage into AC voltage by a switching operation of the switching elements Q3 to Q8 in response to the switching control signals S3 to S8 and drives the AC electric motor M1 so that no torque is generated. Accordingly, the AC electric motor M1 is driven to generate either no torque or positive torque as specified by the torque command value Trqcom.

Moreover, during regenerative braking of the electric vehicle provided with the electric motor drive system 100, the torque command value Trqcom of the AC electric motor M1 is set to a negative value (i.e., Trqcom<0). In this case, the inverter 14 converts the AC voltage generated by the AC electric motor M1 into DC voltage by a switching operation in response to the switching control signals S3 to S8, and supplies that converted DC voltage (i.e., the system voltage) to the converter 12 via the smoothing capacitor C0. Incidentally, regenerative braking in this case includes both braking that accompanies regenerative power generation when there is a brake operation by a driver driving the electric vehicle, and deceleration (or stopping acceleration) of the vehicle while regenerating power by releasing the accelerator pedal while traveling even though the foot brake is not being depressed.

In this way, the inverter 14 performs power conversion between the DC power in the power line 7 and the AC power that drives the AC electric motor M1 by the switching elements Q3 to Q8, so that the AC electric motor M1 operates according to the operation command (i.e., the torque command value).

A current sensor 24 detects the motor current (i.e., the phase current) running through the AC electric motor M1 and outputs the detected value to the control apparatus 30. Incidentally, the sum of the instantaneous values of the three phase currents Iu, Iv, and Iw is zero, so the current sensor 24 need only be arranged to detect the motor current of two phases (such as the V-phase current Iv and the W-phase current Iw), as shown in FIG. 1.

A rotation angle sensor (i.e., a resolver) 25 detects the rotor rotation angle θ of the AC electric motor M1 and outputs that detected rotation angle θ to the control apparatus 30. The control apparatus 30 is able to calculate the rotation speed (rpm) Nmt and the angular velocity ω (rad/s) of the AC electric motor M1 based on the rotation angle θ. Incidentally, the rotation angle sensor 25 may also be omitted by having the control apparatus 30 calculate the rotation angle θ directly from the motor voltage or current.

The control apparatus 30 is formed by an electronic control unit (ECU) with built-in memory, and a CPU (Central Processing Unit), neither of which is shown, and performs operations using the detected values from the various sensors, based on maps and programs stored in the memory. Alternatively, at least a portion of the control apparatus 30 may execute predetermined numeric and logic operations with hardware such as an electronic circuit.

A control mode selecting portion 35 is formed by functional blocks schematically illustrating part of the control function of the AC electric motor M1 by the control apparatus 30. This control mode selecting portion 35 selects a control mode, which will be described in detail later, according to the operating state of the AC electric motor M1.

Figure 2:
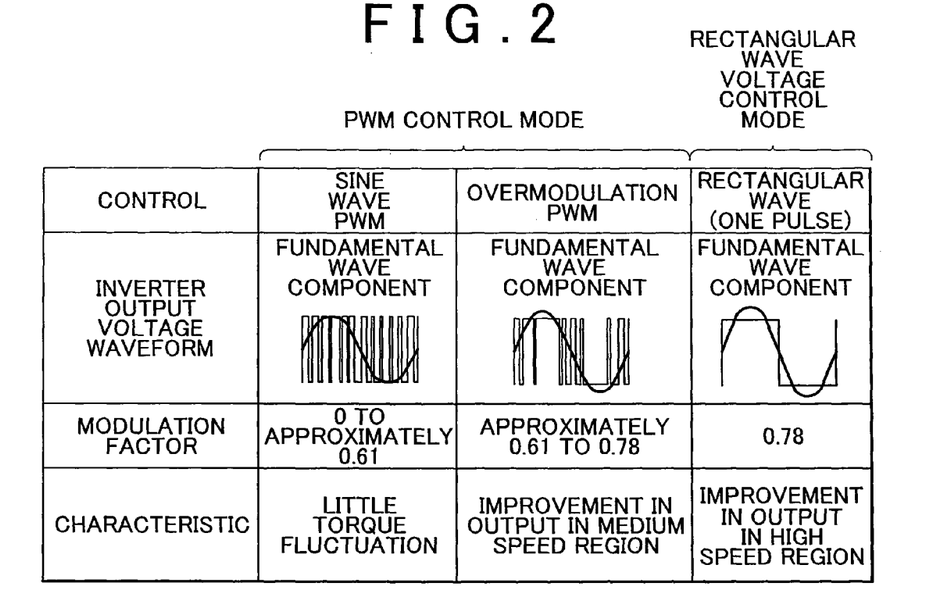
FIG. 2 is a view schematically showing the control modes of an alternating-current electric motor in the electric motor drive system according to this example embodiment of the invention.

(Description of the control modes) FIG. 2 is a view schematically showing the control modes of the AC electric motor M1 in the electric motor drive system 100 according to this example embodiment of the invention.

As shown in FIG. 2, in the electric motor drive system 100 according to the example embodiment of the invention, control of the AC electric motor M1, i.e., power conversion in the inverter 14, is switched among three different control modes.

Sine wave PWM control is used as typical PWM control and controls the phase upper and lower arm elements on and off according to a voltage comparison of a sinusoidal voltage command and a carrier wave (which is representatively a triangular wave). As a result, the duty of the set of the high level time corresponding to the ON time of the upper arm element and the low level time corresponding to the ON time of the lower arm element is controlled such that the fundamental wave component becomes sinusoidal within a fixed period of time. As is well known, with sine wave PWM control in which the amplitude of a sinusoidal voltage command is restricted to equal to or less than a carrier wave amplitude, the fundamental wave component of the voltage applied to the AC electric motor M1 (hereinafter also referred to simply as the "motor applied voltage") can only be increased up to approximately 0.61 times the DC link voltage of the inverter. In the description below, the ratio of the fundamental wave component (i.e., the effective value) of the motor applied voltage (i.e., the line voltage) to the system voltage VH, i.e., the DC link voltage of the inverter 14, will be referred to as the "modulation factor".

In sine wave PWM control, the amplitude of the sine wave voltage command is equal to or less than the carrier wave amplitude, so the line voltage applied to the AC electric motor M1 is sinusoidal. Also, a control method of generating a voltage command by superimposing a 3n-order harmonic wave component (where n is a natural number; representatively a 3rd-order harmonic wave component where n=1) on a sine wave component of equal to or less than the carrier wave amplitude has also been proposed. This control method makes it possible to increase the upper limit value of the modulation factor with which sine wave PWM control can be applied from 0.61 to approximately 0.70.

Incidentally, superimposing the harmonic wave creates a period during which the voltage command becomes higher than the carrier wave amplitude even with sine wave PWM control, but the 3n-order harmonic wave component superimposed on each phase is negated in the line so the line voltage retains the sine wave. In this example embodiment, this control method may also be included in sine wave PWM control.

On the other hand, in rectangular wave voltage control, a single rectangular wave pulse in which the ratio of the high level time to the low level time is 1:1 is applied to the AC electric motor M1. As a result, the modulation factor can be increased to 0.78.

Overmodulation PWM control performs PWM control just like sine wave PWM control in the range where the amplitude of the voltage command (i.e., the sine wave component) is greater than the carrier wave amplitude. More specifically, the fundamental wave component can be increased by distorting the voltage command from its original sine wave shape (i.e., by amplitude correction), which enables the modulation factor to be increased from the highest modulation factor in the sine wave PWM control mode to 0.78. In this overmodulation PWM control, the amplitude of the voltage command (i.e., the sine wave component) is greater than the carrier wave amplitude, so the line voltage applied to the AC electric motor M1 is distorted, not sinusoidal. The 3n-order harmonic wave component can be superimposed on the sine wave component in overmodulation PWM control as well.

In the AC electric motor M1, the induced voltage increases as the rotation speed and the output torque increase, so the required driving voltage (i.e., the required motor voltage) increases. The step-up voltage from the converter 12, i.e., the system voltage VH, must be set higher than this required motor voltage. On the other hand, there is a limit value (i.e., a maximum VH voltage) for the step-up voltage from the converter 12, i.e., the system voltage VH.

Therefore, either the PWM control mode or the rectangular wave voltage control mode is selectively applied, depending on the operating state of the AC electric motor M1. In PWM control, the amplitude and the phase of the voltage applied to the AC electric motor M1 (i.e., the motor applied voltage) are controlled based on feedback of the motor current. On the other hand, in rectangular wave voltage control, the amplitude of the motor applied voltage is fixed, so torque control is executed by phase control of the rectangular wave voltage pulse based on the difference between the actual torque value and the torque command value. Generally, sine wave PWM control is applied in the low speed region, overmodulation PWM control is applied in the medium speed region, and rectangular wave voltage control is applied in the high speed region, according to the operating state of the AC electric motor M1, as is also described in JP-A-2006-311768, JP-A-2007-325351, and JP-A-2009-95144.

However, the control mode must be determined within a modulation factor range where that control mode can be realized. More specifically, when the modulation factor obtained by the system voltage and the command value of the motor applied voltage according to PWM control is equal to or greater than 0.78, it is necessary to select the rectangular wave voltage control. Also, with PWM control, basically when the modulation factor is equal to or less than a predetermined upper limit value (such as 0.61 when the harmonic wave is not superimposed, and 0.70 when the harmonic wave is superimposed), sine wave PWM control is applied, and when the modulation factor is greater than that predetermined upper limit value, overmodulation PWM control is applied.

That is, in this application, sine wave PWM control may correspond to a first control mode that is applied when the modulation factor of power conversion by the inverter 14 is equal to or less than a predetermined value. Also in this application, overmodulation PWM control and rectangular wave voltage control may each correspond to a second control mode for controlling the AC electric motor M1 with a modulation factor that is greater than that of sine wave PWM control.

In this way, it can be understood that the setting of the system voltage VH is affects the selection of the control mode. For example, in order to apply sine wave PWM control, it is necessary to increase the system voltage VH so that the modulation factor becomes equal to or less than the predetermined value. On the other hand, when rectangular wave voltage control is applied, the system voltage VH can be made relatively low. For example, the operating region of the AC electric motor M1 in which the converter 12 is able to operate in the highly efficient step-up stopping mode without stepping up the output voltage of the DC power supply B can be expanded.

Incidentally, reducing the number of switches in the inverter 14 in the rectangular wave voltage control reduces the switching loss, which is advantageous for improving the fuel efficiency of the electric vehicle. Therefore, the rectangular wave voltage control may also be selected in the low speed and medium speed regions in which the PWM control mode can be applied.

The control mode selecting portion 35 selects the control mode taking into account the modulation factor based on the PWM control calculation, according to the operating state of the AC electric motor M1, as described above.

Considering this, the setting of, the voltage command value (i.e., the target value of the system voltage VH) VHr of the converter 12 will be described in detail. The control apparatus 30 further includes a voltage command value setting portion 36 for setting the voltage command value VHr of the converter 12.

Figure 3:
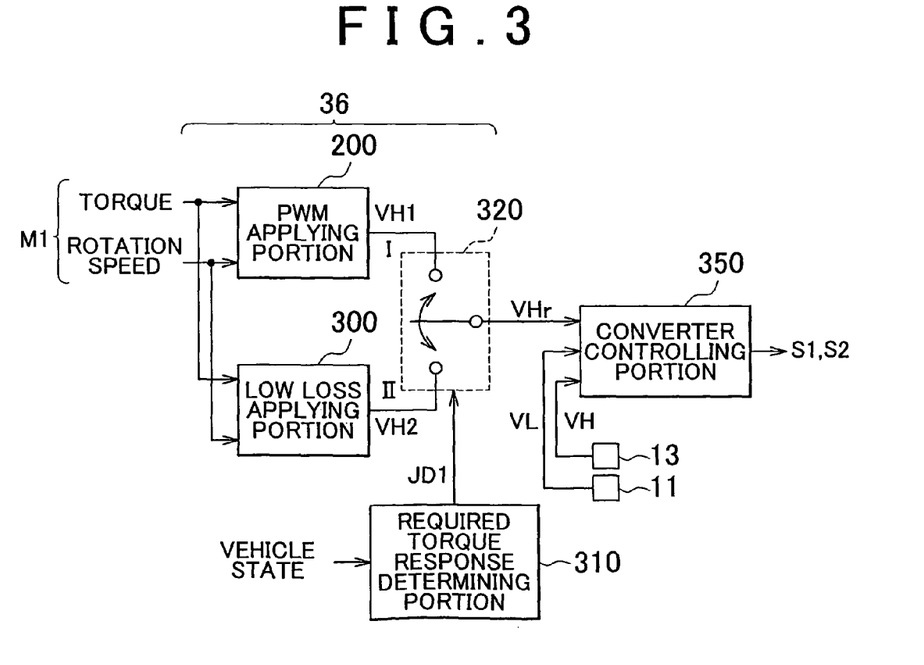
FIG. 3 is a detailed functional block diagram of a voltage command value setting portion shown in FIG. 1.

FIG. 3 is a functional block diagram showing the voltage command value setting portion 36 in greater detail. Incidentally, the functional blocks in the drawings may be realized by providing circuits (i.e., hardware) having functions corresponding to the blocks within the control apparatus 30, or they may be realized by the control apparatus executing software routines according to preset programs.

As shown in FIG. 3, the voltage command value setting portion 36 includes a PWM applying portion 200, a low loss applying portion 300, a required torque response determining portion 310, and a target voltage selecting portion 320.

The PWM applying portion 200 sets a target voltage VH1 that is restricted to within a range such that the control mode of the AC electric motor M1 becomes sine wave PWM control, based on the operating state of the AC electric motor M1 (representatively, the torque and the rotation speed). The specific structure of the PWM applying portion 200 will be described later.

The low loss applying portion 300 generates a target voltage VH2 corresponding to the system voltage VH that minimizes the power loss in the overall electric motor drive system 100, corresponding to the operating state (representatively, the torque and the rotation speed) of the AC electric motor M1. The low loss applying portion 300 outputs the target voltage VH2 according to the current rotation speed and torque of the AC electric motor M1 after referencing a preset map such that the total power loss at the DC power supply (i.e., the battery) B, the converter 12, the inverter 14, and the AC electric motor M1, i.e., the power loss in the overall electric power drive system 100, is minimized, according to the operating state of the AC electric motor M1, for example. That is, the power loss in the overall system when VH=VH2 becomes lower than the power loss in the overall system when VH=VH1.

As described above, the low loss applying portion 300 may apply rectangular wave voltage control as the control mode to reduce the power loss. Therefore, with the low loss applying portion 300, a system voltage VH that preferentially applies the rectangular wave voltage control mode is set. That is, when the system voltage VH is set according to the target voltage VH1 by the PWM applying portion 200, the sine wave PWM control mode that provides high torque controllability can be reliably selected. On the other hand, when the system voltage VH is set according to the target voltage VH2 by the low loss applying portion 300, there is a chance that the sine wave PWM control mode may not be selected. Generally, with the low loss applying portion 300, the operating point (which is determined by the combination of the torque and the rotation speed) at which the target voltage VH2 is set is often such that the system voltage VH is made the minimum voltage under the application of the rectangular wave voltage control.

The required torque response determining portion 310 determines the degree of torque response required of the AC electric motor M1, according to the state of the electric vehicle. More specifically, the required torque response determining portion 310 determines whether the current state of the vehicle is one in which the required torque response is high. This determination can be made according to the required power or torque command value for the AC electric motor M1 calculated based on the vehicle speed of the electric vehicle, or an accelerator operation by the user or the like. For example, when traveling at a low vehicle speed, vehicle vibration from torque fluctuation in the AC electric motor M1 is easily sensed by the user, so it is determined that high torque response is needed. Also, when the required power or torque command value for the AC electric motor M1 is greater than a predetermined value in response to the accelerator being depressed, or when the required power or torque command value is being increased or decreased (i.e., when the amount of change in a unit of time is greater than a predetermined value), it is necessary to ensure vehicle drivability by quickly generating torque, so it is determined that high torque response is needed.

On the other hand, with a structure in which a switch or the like is provided so that the user can select a fuel efficiency priority mode, it may also be uniformly determined that, while the switch is on, high torque response is not needed so priority can be given to improving fuel efficiency over torque response.

In this way, the required torque response determining portion 310 determines whether high torque response is needed (i.e., the drivability priority mode) or high torque response is not needed (i.e., the fuel efficiency priority mode), based on the state of the vehicle which includes operations by the user. In the drivability priority mode, the required torque response determining portion 310 turns on a flag JD1. In the fuel efficiency priority mode, the required torque response determining portion 310 turns off the flag JD1.

The target voltage selecting portion 320 selectively sets either the target voltage VH1 from the PWM applying portion 200 or the target voltage VH2 from the low loss applying portion 300 as the voltage command value VHr for the converter 12. That is, in the drivability priority mode in which the flag JD1 is on, the target voltage selecting portion 320 sets the target voltage VH1 from the PWM applying portion 200 as the voltage command value for the converter 12 (i.e., VHr=VH1), while in the fuel efficiency priority mode in which the flag JD1 is off, the target voltage selecting portion 320 sets the target voltage VH2 from the low loss applying portion 300 as the voltage command value for the converter 12 (i.e., VHr=VH2).

A converter controlling portion 350 controls the duty of the switching elements Q1 and Q2 (FIG. 1) according to the DC voltages VL and VH that correspond to the input and output voltages, respectively, of the converter 12 that are detected by the voltage sensors 11 and 13, respectively, and the voltage command value VHr set by the voltage command value setting portion 36. Then the converter controlling portion 350 outputs switching control signals S1 and S2 for turning the switching elements Q1 and Q2 on and off according to this duty control value.

According to this kind of structure, in the high torque response mode, the converter controlling portion 350 is able to set the voltage command value VHr such that sine wave PWM control that provides high torque controllability can be reliably applied. On the other hand, in the fuel efficiency priority mode, the voltage command value VHr is set such that the power loss in the overall electric motor drive system 100 can be suppressed, without being restricted to applying sine wave PWM control.

Figure 4:
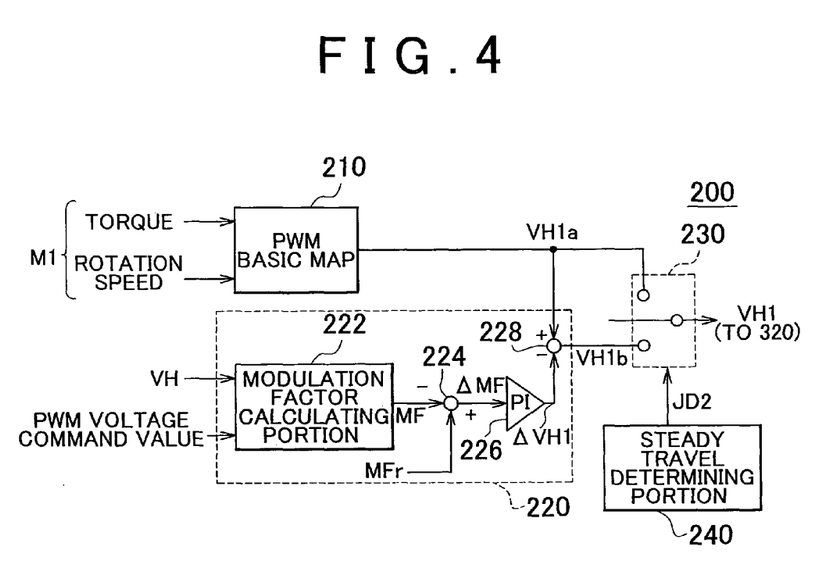
FIG. 4 is a detailed functional block diagram of a PWM applying portion shown in FIG. 3.

Now the setting of the voltage command value in the high torque response mode will be described in greater detail. FIG. 4 is a detailed functional block diagram of the PWM applying portion shown in FIG. 3.

As shown in FIG. 4, the PWM applying portion 200 includes a PWM basic map 210, a correcting portion 220, a selecting portion 230, and a steady travel determining portion 240. The PWM basic map 210 outputs a target voltage VH1$a$ based on the operating state (representatively the torque and the rotation speed) of the AC electric motor M1. The PWM basic map 210 is a map created in advance for setting the system voltage VH at which sine wave PWM can reliably be applied in the current operating state as the target voltage VH1$a$, based on the torque and the rotation speed of the AC electric motor M1.

The correcting portion 220 includes a modulation factor calculating portion 222, a difference calculating portion 224, a control calculating portion 226, and an adding portion 228.

The modulation factor calculating portion 222 calculates a modulation factor. MF based on the system voltage VH, and the motor applied voltage (i.e., the voltage command value) from PWM control. For example, in PWM control following a d-q axis conversion, the modulation factor MF can be calculated according to Expression (1) below. Incidentally, in Expression (1), Vd# is the voltage command value of the d-axis voltage and Vq# is the voltage command value of the q-axis voltage.

$$MF=(Vd\#^2+Vq\#^2)^{1/2}/VH \quad (1)$$

The difference calculating portion 224 calculates a difference ΔMF between the modulation factor MF calculated by the modulation factor calculating portion 222 and a modulation factor target value MFr (ΔMF=MFr−MF). The control calculating portion 226 calculates a correction voltage ΔVH1 for changing the modulation factor MF toward the modulation factor target value MFr based on the modulation factor difference ΔMF obtained by the difference calculating portion 224. The adding portion 228 generates a target voltage VH by correcting the target voltage VH1$a$ set by the PWM basic map 210, which is done by subtracting the correction voltage ΔVH1 from that target voltage VH1$a$.

However, this kind of correction to the target voltage from the modulation factor feedback is performed while restricting the target voltage VH1$b$ to within a range where it is lower than a control upper limit voltage of the system voltage VH. That is, the target voltage VH1$b$ will not be set higher than the control upper limit voltage. This control upper limit voltage is basically a fixed value that is set taking the pressure resistance of the parts and the like into account, but it may also be changed according to the state of the vehicle.

Figure 5A:
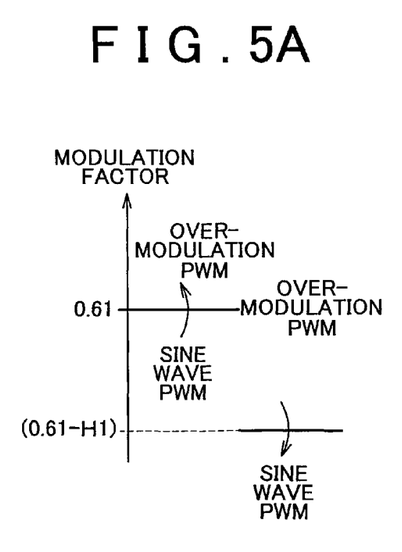
FIGS. 5A and 5B are schematic diagrams illustrating how a modulation factor target value is set.

Here, the modulation factor target value MFr is set to the highest modulation factor value that can be realized with sine wave PWM control. As shown in FIG. 5A, if the modulation factor is increased to more than 0.61 in normal sine wave PWM control in which a harmonic wave is not superimposed, sine wave PWM control will no longer be able to be applied, so overmodulation PWM control will be applied. Therefore, during sine wave PWM control, the modulation factor target value MFr is basically set to equal 0.61 (i.e., MFr=0.61).

However, as shown in FIG. 5A, in order to prevent the control mode from changing frequently due to a slight change in the modulation factor, hysteresis (H1) may be provided in the switch from the overmodulation mode to the sine wave PWM control. The modulation factor target value MFr in this case may be set in response to the hysteresis; and thus set to equal 0.61 minus the hysteresis H1 (i.e., MFr=0.61−H1).

Figure 5B:
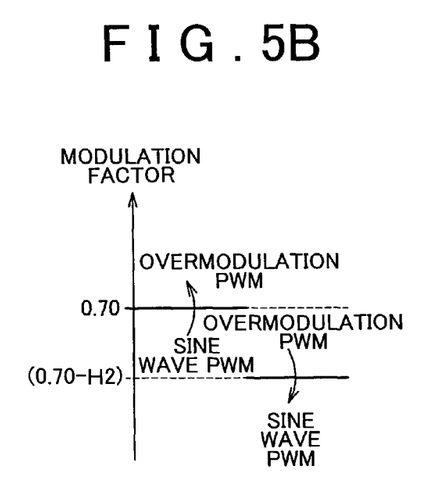

Also, as shown in FIG. 5B, with sine wave PWM control in which a harmonic wave is superimposed, the modulation factor upper limit value can be increased to 0.70, so the modulation factor target value MFr is basically set to 0.70 (i.e., MFr=0.70). When hysteresis (H2) is provided in the switch from the overmodulation mode to the sine wave PWM control, the modulation factor target value MFr may also be set in response to the hysteresis, and thus set to equal 0.70 minus the hysteresis H2 (i.e., MFr=0.70−H2).

Again, as shown in FIG. 4, the steady travel determining portion 240 determines whether the vehicle is traveling steadily based on the current torque control state, and sets the flag JD2 according to the determination results. For example, when the torque control is stable, e.g., when the difference (i.e., the absolute value) between the current output torque of the AC electric motor M1 and the required torque (i.e., the torque command value) is less than a predetermined determining value, the steady travel determining portion 240 determines that the vehicle is traveling steadily, and turns on the flag JD2. If, on the other hand, the difference (i.e., the absolute value) between that output torque and the required torque is greater than the determining value, the steady travel determining portion 240 determines that the vehicle is not traveling steadily, and turns off the flag JD2. Incidentally, the determining value for determining whether the vehicle is traveling steadily may also be changed according to the state of the vehicle (such as the vehicle speed).

When the vehicle is traveling steadily (i.e., when the flag JD2 is on), the selecting portion 230 outputs the target voltage VH1b calculated by the correcting portion 220 to the target voltage selecting portion 320 shown in FIG. 3, as the target voltage VH1 from the PWM applying portion 200. On the other hand, when the vehicle is not traveling steadily (i.e., when the flag JD2 is off), the selecting portion 230 outputs the target voltage VH1a calculated by the PWM basic map 210 to the target voltage selecting portion 320 (FIG. 3), as the target voltage VH1 from the PWM applying portion 200.

In this example embodiment, even when sine wave PWM control is reliably applied, the target voltage VH1b can be corrected by the modulation factor feedback from the correcting portion 220 such that power conversion is performed with the highest modulation factor in that region, so fuel efficiency can be improved by reducing the power loss.

On the other hand, changing the system voltage VH frequently may change the operation (i.e., step-up or step-down) of the converter 12, which may cause the power loss to increase or the torque controllability to decrease.

Therefore, this example embodiment aims to eliminate that possibility by reflecting the modulation factor feedback by the correcting portion 220 in the target voltage VH1 only when the vehicle is traveling steadily (i.e., when torque control is stable), at which time it is unlikely that the control behavior will change greatly. That is, when the vehicle is not traveling steadily (i.e., when torque control is unstable), modulation factor feedback by the correcting portion 220 is not executed, such that the target voltage VH1a set by the PWM basic map 210 is set as it is as the target voltage VH1 from the PWM applying portion 200.

This example embodiment thus makes it possible to improve fuel efficiency by reducing power loss, even in a high response mode which gives priority to high torque response over fuel efficiency and reliably applies sine wave PWM control.

Incidentally, in the structure shown in FIG. 3, the PWM applying portion 200 may correspond to first setting means and the low loss setting portion 300 may correspond to second setting means of the invention. Also, the required torque response determining portion 310 may correspond to required torque response determining means of the invention. Further, in the structure shown in FIG. 4, the PWM basic map 210 may correspond to basic setting means of the invention, and the correcting portion 220 may correspond to correcting means of the invention. Also, the selecting portion 230 may correspond to selecting means of the invention, and the steady travel determining portion 240 may correspond to determining means of the invention. Further, the modulation factor calculating portion 222 may correspond to first calculating means of the invention, and the difference calculating portion 224 and the control calculating portion 226 may correspond to second calculating means of the invention. In addition, the adding portion 228 may correspond to third calculating means of the invention.

Here, the converter 12 is able to greatly reduce the power loss by operating in the step-up stopping mode that fixes the upper arm element (Q1) on and the lower arm element (Q2) off. Therefore, even in the high response mode, the converter 12 may also be operated in this step-up stopping mode as much as possible within a modulation factor range that enables the step-up stopping mode to be applied.

Figure 6:
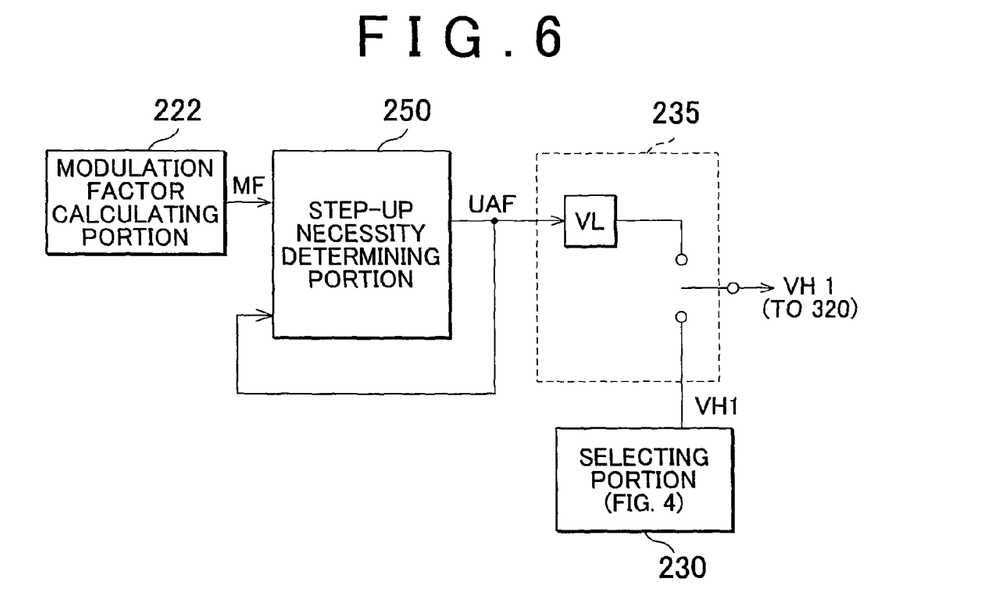
FIG. 6 is a functional block diagram of a control structure for further improving fuel efficiency in a high response mode.

The PWM applying portion 200 is able to further improve the fuel efficiency of the electric vehicle in the high response mode by adding the control structure shown in FIG. 6 to the control structure shown in FIG. 4.

As shown in FIG. 6, the PWM applying portion 200 further includes a step-up necessity determining portion 250 and a selecting portion 235, in addition to the structure shown in FIG. 4.

When the converter 12 is operating in the step-up stopping mode (i.e., when a step-up necessity flag UAF is off), the modulation factor calculating portion 222 calculates the modulation factor MF with the system voltage VH=VL. Then when the step-up necessity flag UAF is off, the step-up necessity determining portion 250 determines whether a step-up operation by the converter 12 is necessary based on this modulation factor MF. When the calculated modulation factor MF is within a range in which sine wave PWM control can be applied, the step-up necessity determining portion 250 determines that a step-up operation by the converter 12 is not necessary, and keeps the step-up necessity flag UAF off.

When the step-up necessity flag UAF is off, the selecting portion 235 sets the target voltage VH1 from the PWM applying portion 200 to VL (i.e., VH1=VL) in order to operate the converter 12 in the step-up stopping mode. As a result, the voltage command value VHr of the converter 12 is set to VL (i.e., VHr=VL). Alternatively, the converter controlling portion 350 may also be structured to operate the converter 12 in the step-up stopping mode without being restricted by the voltage command value VHr when the step-up necessity flag UAF is off.

On the other hand, when the modulation factor that is able to apply sine wave PWM control is exceeded due to the system voltage VH being equal to VL (i.e., VH=VL) when a step-up operation is stopped, the step-up necessity determining portion 250 determines that a step-up operation by the converter 12 is required and turns on the step-up necessity flag UAF. When the step-up necessity flag UAF is on, the selecting portion 235 sets the target voltage VH1 from the selecting portion 230, that is set by the structure in FIG. 4, to the target voltage VH1 from the PWM applying portion 200.

Incidentally, once the step-up necessity flag UAF has been turned on, a step-up operation by the converter 12 again becomes unnecessary when the target voltage VH1a from the PWM basic map 210 is set to a step-up unnecessary voltage level (VH1a=Vb, VL level), so the converter 12 operates in the step-up stopping mode and the step-up necessity flag UAF is again turned off.

In this way, forming the PWM applying portion 200 by combining the structures in FIGS. 4 and 6, makes it possible to minimize the number of step-up operations performed by the converter 12, which further reduces power loss and improves the fuel efficiency of the electric vehicle.

Next, a control routine for setting the voltage command value of the converter 12 in the electric motor drive system according to the example embodiment described in FIGS. 3 to 6 will be described. That is, the steps in the flowcharts shown in FIGS. 7 to 10 are realized by hardware or software by the control apparatus 30.

Figure 7:
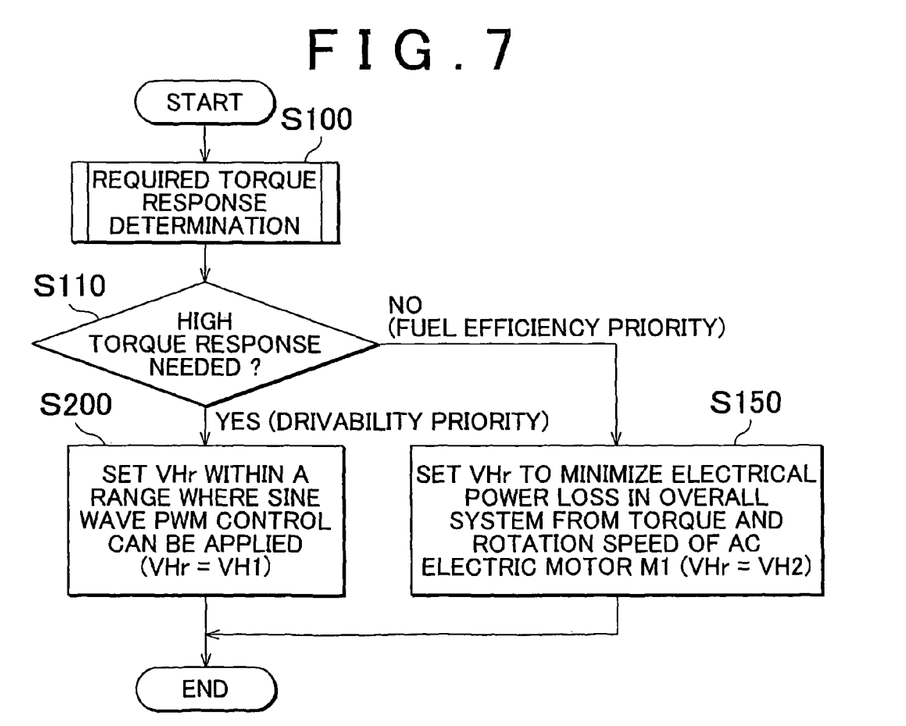
FIG. 7 is a flowchart illustrating a routine for setting a converter voltage command value in the electric motor drive system according to the example embodiment of the invention.

FIG. 7 is a flowchart illustrating a routine for setting the converter voltage command value in the electric motor drive system according to the example embodiment of the invention. The routine in the flowchart shown in FIG. 7 is executed in predetermined control cycles by the control apparatus 30.

As shown in FIG. 7, in step S100, the control apparatus 30 makes a required torque response determination to determine whether the electric vehicle is in a state in which high torque response is needed. This required torque response determination in step S100 corresponds to the setting of the flag JD2 by the required torque response determining portion 310 shown in FIG. 3.

Then in step S110, the control apparatus 30 determines whether high torque response is needed according to the determination results in step S100. If the drivability priority mode in which high torque response is needed is selected (i.e., when the determination in step S110 is YES), then in step S200 the control apparatus 30 sets the voltage command value VHr in a range in which sine wave PWM control can be applied. That is, the voltage command value VHr is set according to the target voltage VH1 from the PWM applying portion 200 shown in FIG. 3 (i.e., VHr=VH1).

If, on the other hand, the fuel efficiency priority mode in which high torque response is not needed is selected (i.e., when the determination in step S110 is NO), then in step S150 the control apparatus 30 sets the voltage command value VHr such that the power loss in the overall electric motor drive system 100 is minimized, based on the operating state (i.e., the torque and the rotation speed) of the AC electric motor M1. That is, the voltage command value VHr is set according to the target voltage VH2 from the low loss applying portion 300 shown in FIG. 3 (i.e., VHr=VH2).

Figure 8:
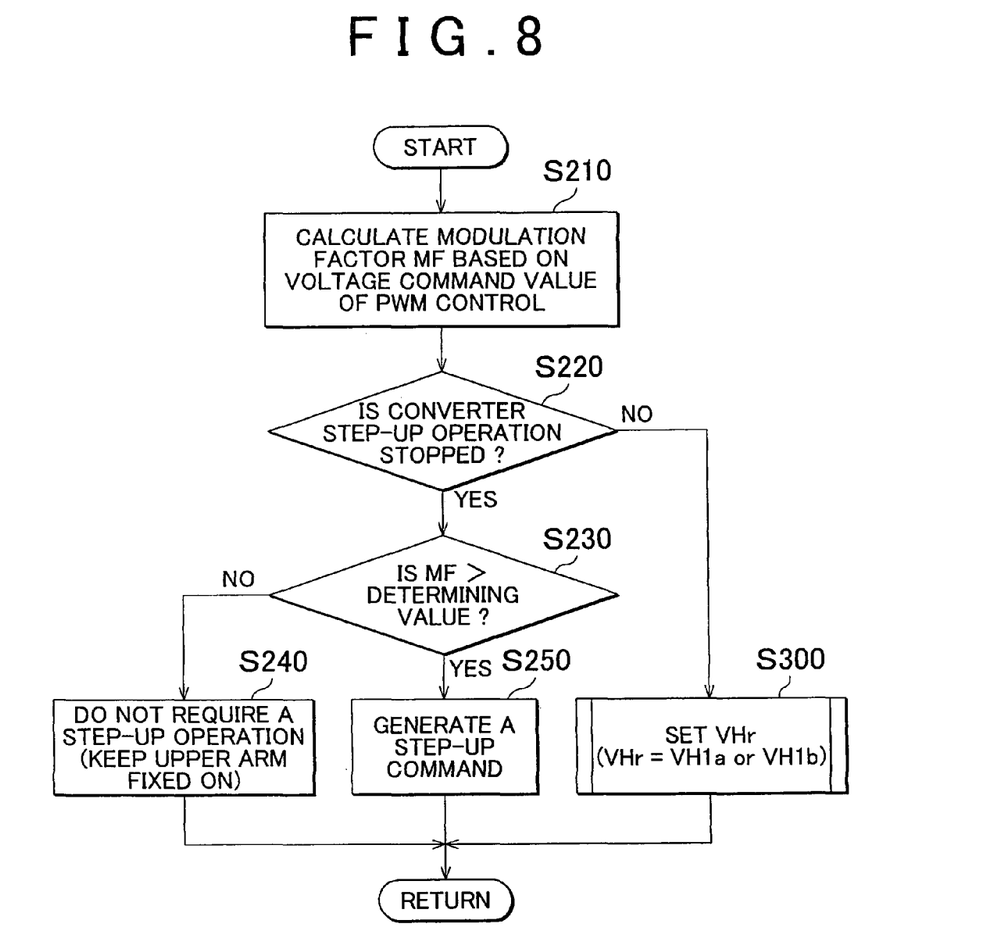
FIG. 8 is a flowchart detailing the steps for setting the converter voltage command value in a drivability priority mode.

Next, the control process of step S200 in FIG. 7 will be described in detail. As shown in FIG. 8, in step S210, the control apparatus 30 calculates the current modulation factor MF based on the voltage command value from the PWM control calculation. The process in step S210 corresponds to the function of the modulation factor calculating portion 222 (FIG. 4).

Further, in step S220, the control apparatus 30 determines whether the converter 12 is operating in the step-up stopping mode. The determination in step S220 may be made based on the step-up necessity flag UAF (FIG. 6). If the converter is operating in the step-up stopping mode (i.e., when the determination in step S220 is YES), the process then proceeds on to step S230, where the control apparatus 30 determines whether the current modulation factor MF calculated with the system voltage VH=VL is higher than a predetermined determining value. If the modulation factor MF is equal to or less than the determining value (i.e., when the determination in step S230 is NO), then in step S240 the control apparatus 30 does not require that the converter 12 perform a step-up operation, but instead keeps the converter 12 in the step-up stopping mode. As a result, the converter 12 operates in a state in which the upper arm element (Q1) is fixed on.

If, on the other hand, the modulation factor MF exceeds the determining value (i.e., when the determination in step S230 is YES), then the system voltage VH needs to be set higher than VL in order to apply sine wave PWM control, so the control apparatus 30 generates a step-up necessary command in step S250. Once a step-up necessary command is generated, the determination in step S220 will be YES from the next control cycle.

When the converter 12 is operating in the step-up mode (i.e., when the determination in step S220 is NO), the control apparatus 30 sets the voltage command value VHr in step S300.

Next, the control process of step S300 in FIG. 3 will be described in detail with reference to FIGS. 9 and 10.

Figure 9:
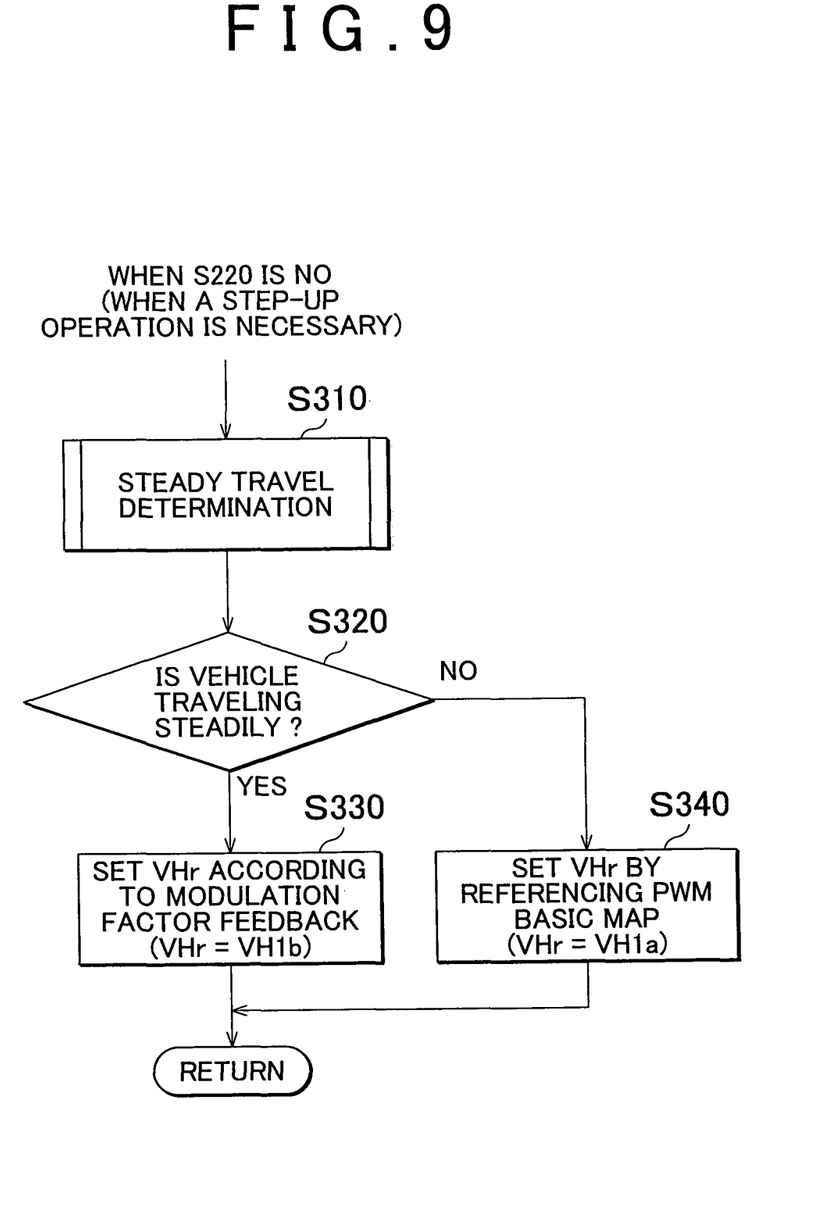
FIG. 9 is a flowchart detailing the steps for setting the converter voltage command value during a step-up operation.

As shown in FIG. 9, step S300 (FIG. 8) includes steps S310 to S340. That is, when the determination in step S220 is NO, the control apparatus 30 makes a steady travel determination focusing on the current torque control state in step S310.

Figure 10:
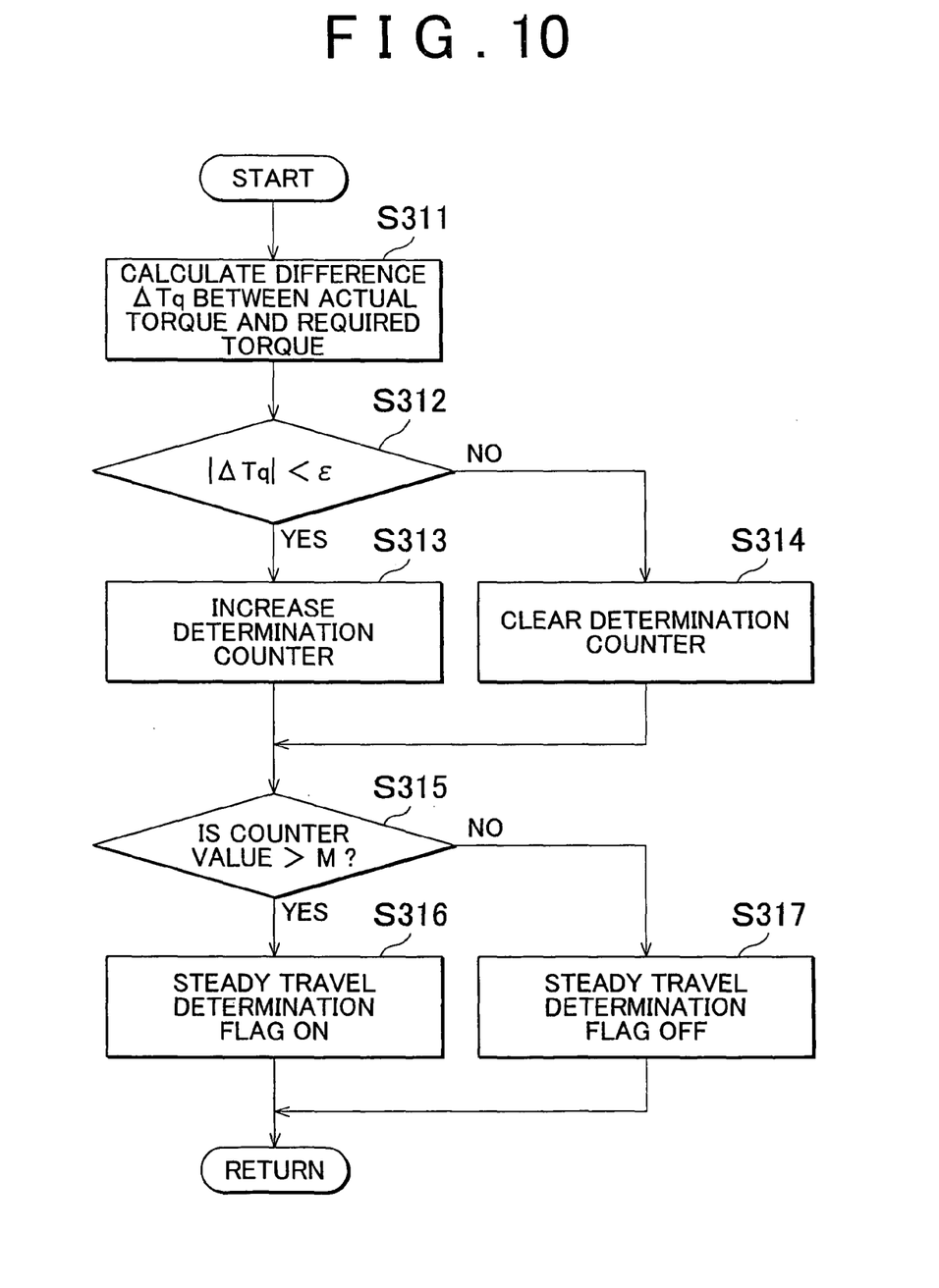
FIG. 10 is a flowchart detailing the steps for making a steady travel determination shown in FIG. 9.

FIG. 10 shows in detail how the steady travel determination in step S310 in FIG. 9 is made. As shown in FIG. 10, step S310 (FIG. 9) includes steps 5311 to S317. In the steady travel determination in step S310, the control apparatus 30 first calculates the difference ΔTq between the actual torque of the AC electric motor M1 and the required torque (i.e., the torque command value) in step S311, and then determines whether the torque difference |ΔTq| is less than a predetermined value ε in step S312.

If the torque difference |ΔTq| is less than the predetermined value ε (i.e., when the determination in step S312 is YES), the process proceeds on to step S313, where the control apparatus 30 increases the count of a determination counter. That is, the counter value is increased by one from the current value. If, on the other hand, the torque difference |ΔTq| is equal to or greater than the predetermined value ε (i.e., when the determination in step S312 is NO), the control apparatus 30 clears the determination counter in step S314. That is, the control apparatus 30 sets the counter value to 0.

In step S315, the control apparatus 30 determines whether the counter value obtained from step S313 or S314 exceeds a determining value M. If the counter value exceeds the determining value M (i.e., when the determination in step S315 is YES), the control apparatus 30 turns the steady travel determination flag on in step S316. If, on the other hand, the counter value is equal to or less than the determining value M (i.e., when the determination in step S315 is NO), the control apparatus 30 turns the steady travel determination flag off in step S317.

As a result, in the steady travel determination (step S310), the steady travel determining flag is turned on when the torque difference |ΔTq| of the AC electric motor M1 continues to be equal to or less than the predetermined value s for longer than a predetermined period of time that corresponds to the determining value M, and is turned off otherwise. The steady travel determining portion 240 shown in FIG. 4 also sets the flag JD2 according to the same determination results as in step S310.

As shown in FIG. 9 again, once the steady travel determination (step S310) ends, the process proceeds on to step S320 where the control apparatus 30 determines whether the vehicle is traveling steadily based on the steady travel determination results. If the vehicle is traveling steadily (i.e., when the determination in step S320 is YES), then in step S330 the control apparatus 30 sets the voltage command value VHr according to the correction of the control target voltage from the modulation factor feedback. That is, the target voltage VH1b obtained by the correcting portion 220 in FIG. 4 is set as the voltage command value VHr.

If, on the other hand, the vehicle is not traveling steadily (i.e., when the determination in step S320 is NO), then in step S340 the control apparatus 30 sets the voltage command value VHr according to a reference value in the PWM basic map 210 shown in FIG. 4. That is, the voltage command value VHr is set to VH1a (i.e., VHr=VH1a).

In this way, according to the flowchart in FIG. 8, in the drivability priority mode, fuel efficiency can be improved by the reduction in power loss, just as with the structures shown in FIGS. 4 and 6, when setting the voltage command value VHr so that sine wave PWM control can be reliably applied.

That is, the flowcharts shown in FIGS. 7 to 10 make it possible to set the control target voltage of the converter 12 with the electric motor drive system according to the example embodiment of the invention.

As described above, in the electric motor drive system according to the example embodiment of the invention, when high torque response is needed based on the determination of whether the vehicle is in a state in which high torque response is needed, the voltage command value VHr of the converter 12 is set so that sine wave PWM control that provides high torque controllability can be applied. On the other hand, when the vehicle is in a state in which high torque response is not needed, the voltage command value VHr is set to minimize power loss in the electric motor drive system, without being restricted to a value that enables sine wave PWM control to be applied. As a result, the voltage command value VHr of the converter 12 can be set to improve fuel efficiency by suppressing power loss in the system, while ensuring drivability of the electric vehicle by ensuring torque controllability, according to the state of the vehicle.

Also, even when sine wave PWM control is applied, fuel efficiency can still be improved by improving efficiency, which is achieved by feedback-controlling the voltage command value VHr so that control is executed with the highest modulation factor value. Moreover, the voltage command value is set according to modulation factor feedback only when the vehicle is traveling steadily, in which case the torque control state is stable, which makes it possible to prevent problems from occurring due to the system voltage changing frequently when the torque control state is unstable.

Incidentally, any appropriate structure may be used to generate vehicle driving force in the electric vehicle provided with the electric motor drive system described above. That is, the invention may likewise be applied to any vehicle powered partially or entirely by electricity, that is provided with an electric motor for generating wheel driving force that is driven by electric power, including a fuel cell vehicle and an electric vehicle that do not have an engine, and a hybrid vehicle that does have an engine.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An electric motor drive system for an electric vehicle provided with an alternating-current electric motor for generating vehicle driving force, comprising:
   a direct-current power supply;
   a converter structured so as to output a second direct-current voltage that is equal to or higher than a first direct-current voltage from the direct-current power supply to a direct-current power supply line by variably controlling the first direct-current voltage according to a voltage command value;
   an inverter that is structured so as to perform power conversion between direct-current power in the direct-current power supply line and alternating-current power that drives the alternating-current electric motor, by a plurality of switching elements such that the alternating-current electric motor operates according to an operating command;
   a control mode selecting unit that controls the inverter according to one of two modes, one mode being a first control mode that is applied when a modulation factor of the power conversion, which is expressed by the ratio of a fundamental wave component of the amplitude of a line voltage of the alternating-current electric motor to the second direct-current voltage, is equal to or less than a predetermined value, and the other mode being a second control mode for controlling the alternating-current electric motor with a modulation factor that is higher than that of the first control mode; and
   a voltage command value setting unit that sets the voltage command value for the converter,
   wherein the voltage command value setting unit includes i) a required torque response determining unit that determines the degree of torque response required of the alternating-current electric motor, according to the state of the electric vehicle, ii) a first setting unit that sets the voltage command value within a range of the second direct-current voltage where the first control mode is able to be applied, according to the operating state of the alternating-current electric motor when it is determined that the required torque response is higher than a predetermined level, and iii) a second setting unit that sets the voltage command value such that the second control mode is able to be applied, according to the operating state of the alternating-current electric motor when it is determined that the required torque response is not higher than the predetermined level.

2. The electric motor drive system according to claim 1, wherein power loss in the overall electric motor drive system at the second direct-current voltage corresponding to the voltage command value set by the second setting unit is less than the power loss at the second direct-current voltage corresponding to the voltage command value set by the first setting unit.

3. The electric motor drive system according to claim 1, wherein the second setting unit sets the voltage command value in response to the second direct-current voltage at which power loss, that is in the overall electric motor drive system at the second direct-current voltage corresponding to the voltage command value set by the second setting unit, at an operating point of the alternating-current electric motor corresponding to the current operating state is minimized, according to a preset relationship among the operating point of the alternating-current electric motor, the second direct-current voltage, and the power loss.

4. The electric motor drive system according to claim 1, wherein the first setting unit includes i) a basic setting unit that sets a first target voltage corresponding to a basic value of the second direct-current voltage for applying the first control mode, at an operating point that is determined by rotation speed and torque and corresponds to the current operating state of the alternating-current electric motor, and ii) a correcting unit that sets the voltage command value by correcting the first target voltage such that the modulation factor becomes the maximum value within a range within which the first control mode is able to be applied.

5. The electric motor drive system according to claim 4, wherein the first setting unit further includes iii) a determining unit that determines whether the electric vehicle is in a steady traveling state based on a torque control state of the alternating-current electric motor; and iv) a voltage command value selecting unit that sets the first target voltage that has been corrected by the correcting unit as the voltage command value, when the electric vehicle is in the steady traveling state, and setting the first target voltage from the basic setting unit as the voltage command value without that first target voltage being corrected, when it is determined that the electric vehicle is not in the steady traveling state.

6. The electric motor drive system according to claim 4, wherein the correcting unit includes i) a first calculating unit that calculates the modulation factor based on an output voltage command value of the inverter and the second direct-current voltage, ii) a second calculating unit that calculates a correction voltage according to a difference between the calculated modulation factor and the maximum value, and iii) a third calculating unit that subtracts the correction voltage from the first target voltage set by the basic setting unit.

7. The electric motor drive system according to claim 6, wherein the first setting unit further includes iv) a step-up necessity determining unit that determines whether a step-up operation by the converter is necessary based on the modulation factor calculated by the first calculating unit, and v) a step-up stopping mode selecting unit that selects a step-up stopping mode without stepping up an output voltage of the direct-current power supply when the step-up necessity determining unit determines that the step-up operation is not necessary.

8. The electric motor drive system according to claim 7, wherein the step-up stopping mode selecting unit sets the voltage command value to the first target voltage when the step-up necessity determining unit determines that the step-up operation is not necessary.

9. The electric motor drive system according to claim 6, further comprising a converter controlling unit that duty controls the converter according to the first direct-current voltage and the second direct-current voltage, and the voltage command value set by the voltage command value setting unit,
wherein the first setting unit further includes iv) a step-up necessity determining unit that determines whether a step-up operation by the converter is necessary based on the modulation factor calculated by the first calculating unit, and
wherein the converter controlling unit operates the converter in a step-up stopping mode when the step-up necessity determining unit has determined that the step-up operation is not necessary.

10. The electric motor drive system according to claim 5, wherein the determining unit determines that the electric vehicle is in the steady traveling state when a difference between an actual torque and a torque command value for the alternating-current electric motor has continued to be less than a predetermined determining value for a predetermined period of time.

11. The electric motor drive system according to claim 1, wherein:
in the first control mode, a torque of the alternating-current electric motor is controlled by sine wave pulse width modulation control; and
in the second control mode, the torque of the alternating-current electric motor is controlled by overmodulation pulse width modulation control or rectangular wave voltage control.

12. An electric motor drive method for an electric vehicle provided with an alternating-current electric motor for generating vehicle driving force, characterized by comprising:
determining the degree of torque response required of the alternating-current electric motor according to the state of the electric vehicle;
setting a voltage command value within a range of the second direct-current voltage where a first control mode is able to be applied, according to the operating state of the alternating-current electric motor when it is determined that the required torque response is higher than a predetermined level; and
setting the voltage command value such that a second control mode is able to be applied, according to the operating state of the alternating-current electric motor when it is determined that the required torque response is not higher than the predetermined level.

* * * * *